(12) United States Patent
Wu et al.

(10) Patent No.: US 8,045,810 B2
(45) Date of Patent: Oct. 25, 2011

(54) METHOD AND SYSTEM FOR DECODING ENCODED IMAGES AND REDUCING THE SIZE OF SAID IMAGES

(75) Inventors: Guixing Wu, Waterloo (CA); Brian Lamb, Waterloo (CA); En-Hui Yang, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 904 days.

(21) Appl. No.: 12/038,905

(22) Filed: Feb. 28, 2008

(65) Prior Publication Data

US 2009/0220163 A1    Sep. 3, 2009

(51) Int. Cl.
*G06K 9/36* (2006.01)

(52) U.S. Cl. ....................................................... 382/232

(58) Field of Classification Search .......... 382/232–233, 382/235–236, 238–239, 248, 250–251; 348/390.1, 348/394.1–395.1, 403.1, 420.1–421.1; 375/240.03, 375/240.18, 240.2, 240.24–240.25
See application file for complete search history.

(56) References Cited

U.S. PATENT DOCUMENTS

| | | | | |
|---|---|---|---|---|
| 5,583,572 A | * | 12/1996 | Sumihiro | 348/396.1 |
| 5,995,149 A | * | 11/1999 | Saunders et al. | 375/240.18 |
| 6,167,085 A | * | 12/2000 | Saunders et al. | 375/240.03 |
| 6,552,749 B1 | * | 4/2003 | Jones et al. | 348/441 |
| 7,050,656 B2 | | 5/2006 | Bhaskaran et al. | |
| 7,062,098 B1 | * | 6/2006 | Mitchell et al. | 382/235 |
| 2007/0025442 A1 | | 2/2007 | Okada et al. | |
| 2007/0081586 A1 | | 4/2007 | Raveendran et al. | |

OTHER PUBLICATIONS

Canadian Patent Application No. 2,622,842 Office Action dated Mar. 7, 2011.
"Terminal Equipment and Protocols for Telematic Services: Information Technology—Digital Compression and Coding of Continuous-Tone Still Images—Requirements And Guidelines", CCITT Rec. T.81 (1992 E), pp. 1-182.
Arai et al., "A Fast DCT-SQ Scheme for Images", The Transactions of the IEICE, vol. E 71, No. 11, Nov. 1988, pp. 1095-1097.
Ahmed et al., The Discrete Cosine Transform (DCT), IEEE Trans. Computers, Jan. 1974, pp. 90-93.

* cited by examiner

*Primary Examiner* — Jose Couso
(74) *Attorney, Agent, or Firm* — Leslie A. Kinsman; Borden Ladner Gervais LLP

(57) ABSTRACT

A method and system for reducing the number of mathematical operations required in the JPEG decoding process without substantially impacting the quality of the image displayed is disclosed. Embodiments provide an efficient JPEG decoding process for the purposes of displaying an image on a display smaller than the source image, for example, the screen of a handheld device. According to one aspect of the invention, this is accomplished by reducing the amount of processing required for dequantization and inverse DCT (IDCT) by effectively reducing the size of the image in the quantized, DCT domain prior to dequantization and IDCT. This can be done, for example, by discarding unnecessary DCT index rows and columns prior to dequantization and IDCT. In one embodiment, columns from the right, and rows from the bottom are discarded such that only the top left portion of the block of quantized, and DCT coefficients are processed.

25 Claims, 8 Drawing Sheets

$$\mathbf{F} = \begin{bmatrix} F_{11} & \cdots & F_{1J} \\ \cdots & \cdots & \cdots \\ F_{I1} & \cdots & F_{IJ} \end{bmatrix} \overbrace{\phantom{xxxxx}}^{201}$$

$$F_{ij} = \begin{bmatrix} f_{11} & \cdots & f_{18} \\ \cdots & \cdots & \cdots \\ f_{81} & \cdots & f_{88} \end{bmatrix} \overbrace{\phantom{xxxxx}}^{202}$$

203

$$Q = \begin{bmatrix} q_{11} & \cdots & q_{18} \\ \cdots & \cdots & \cdots \\ q_{81} & \cdots & q_{88} \end{bmatrix} \overbrace{\phantom{xxxxx}}^{204}$$

$$F_{ij} \bullet Q = \overline{F_{ij}} = \begin{bmatrix} q_{11}f_{11} & \cdots & q_{18}f_{18} \\ \cdots & \cdots & \cdots \\ q_{81}f_{81} & \cdots & q_{88}f_{88} \end{bmatrix} \overbrace{\phantom{xxxxx}}^{205}$$

$$X_{ij} = \begin{bmatrix} x_{11} & \cdots & x_{18} \\ \cdots & \cdots & \cdots \\ x_{81} & \cdots & x_{88} \end{bmatrix} \overbrace{\phantom{xxxxx}}^{206}$$

$$\mathbf{X} = \begin{bmatrix} X_{11} & \cdots & X_{1J} \\ \cdots & \cdots & \cdots \\ X_{I1} & \cdots & X_{IJ} \end{bmatrix} \overbrace{\phantom{xxxxx}}^{207}$$

FIG. 2

$$F_{ij} = \begin{bmatrix} f_{11} & f_{12} & f_{13} & f_{14} & f_{15} & f_{16} & f_{17} & f_{18} \\ f_{21} & f_{22} & f_{23} & f_{24} & f_{25} & f_{26} & f_{27} & f_{28} \\ f_{31} & f_{32} & f_{33} & f_{34} & f_{35} & f_{36} & f_{37} & f_{38} \\ f_{41} & f_{42} & f_{43} & f_{44} & f_{45} & f_{46} & f_{47} & f_{48} \\ f_{51} & f_{52} & f_{53} & f_{54} & f_{55} & f_{56} & f_{57} & f_{58} \\ \hline f_{61} & f_{62} & f_{63} & f_{64} & f_{65} & f_{66} & f_{67} & f_{68} \\ f_{71} & f_{72} & f_{73} & f_{74} & f_{75} & f_{76} & f_{77} & f_{78} \\ f_{81} & f_{82} & f_{83} & f_{84} & f_{85} & f_{86} & f_{87} & f_{88} \end{bmatrix} \longrightarrow F_{ij}' = \begin{bmatrix} f_{11} & f_{12} & f_{13} & f_{14} & f_{15} \\ f_{21} & f_{22} & f_{23} & f_{24} & f_{25} \\ f_{31} & f_{32} & f_{33} & f_{34} & f_{35} \\ f_{41} & f_{42} & f_{43} & f_{44} & f_{45} \\ f_{51} & f_{52} & f_{53} & f_{54} & f_{55} \end{bmatrix}$$

501 502

$$Q = \begin{bmatrix} q_{11} & q_{12} & q_{13} & q_{14} & q_{15} & q_{16} & q_{17} & q_{18} \\ q_{21} & q_{22} & q_{23} & q_{24} & q_{25} & q_{26} & q_{27} & q_{28} \\ q_{31} & q_{32} & q_{33} & q_{34} & q_{35} & q_{36} & q_{37} & q_{38} \\ q_{41} & q_{42} & q_{43} & q_{44} & q_{45} & q_{46} & q_{47} & q_{48} \\ q_{51} & q_{52} & q_{53} & q_{54} & q_{55} & q_{56} & q_{57} & q_{58} \\ \hline q_{61} & q_{62} & q_{63} & q_{64} & q_{65} & q_{66} & q_{67} & q_{68} \\ q_{71} & q_{72} & q_{73} & q_{74} & q_{75} & q_{76} & q_{77} & q_{78} \\ q_{81} & q_{82} & q_{83} & q_{84} & q_{85} & q_{86} & q_{87} & q_{88} \end{bmatrix} \longrightarrow Q' = \begin{bmatrix} q_{11} & q_{12} & q_{13} & q_{14} & q_{15} \\ q_{21} & q_{22} & q_{23} & q_{24} & q_{25} \\ q_{31} & q_{32} & q_{33} & q_{34} & q_{35} \\ q_{41} & q_{42} & q_{43} & q_{44} & q_{45} \\ q_{51} & q_{52} & q_{53} & q_{54} & q_{55} \end{bmatrix}$$

503

$$F_{ij}' \bullet Q' = \begin{bmatrix} f_{11}q_{11} & f_{12}q_{12} & f_{13}q_{13} & f_{14}q_{14} & f_{15}q_{15} \\ f_{21}q_{21} & f_{22}q_{22} & f_{23}q_{23} & f_{24}q_{24} & f_{25}q_{25} \\ f_{31}q_{31} & f_{32}q_{32} & f_{33}q_{33} & f_{34}q_{34} & f_{35}q_{35} \\ f_{41}q_{41} & f_{42}q_{42} & f_{43}q_{43} & f_{44}q_{44} & f_{45}q_{45} \\ f_{51}q_{51} & f_{52}q_{52} & f_{53}q_{53} & f_{54}q_{54} & f_{55}q_{55} \end{bmatrix}$$

$$F_{ij} = \begin{bmatrix} f_{11} & f_{12} & f_{13} & f_{14} & f_{15} & f_{16} & f_{17} & f_{18} \\ f_{21} & f_{22} & f_{23} & f_{24} & f_{25} & f_{26} & f_{27} & f_{28} \\ f_{31} & f_{32} & f_{33} & f_{34} & f_{35} & f_{36} & f_{37} & f_{38} \\ f_{41} & f_{42} & f_{43} & f_{44} & f_{45} & f_{46} & f_{47} & f_{48} \\ f_{51} & f_{52} & f_{53} & f_{54} & f_{55} & f_{56} & f_{57} & f_{58} \\ f_{61} & f_{62} & f_{63} & f_{64} & f_{65} & f_{66} & f_{67} & f_{68} \\ f_{71} & f_{72} & f_{73} & f_{74} & f_{75} & f_{76} & f_{77} & f_{78} \\ f_{81} & f_{82} & f_{83} & f_{84} & f_{85} & f_{86} & f_{87} & f_{88} \end{bmatrix} \longrightarrow F_{ij}' = \begin{bmatrix} f_{11} & f_{12} \\ f_{21} & f_{22} \end{bmatrix} \sim 602$$

∼601

$$Q = \begin{bmatrix} q_{11} & q_{12} & q_{13} & q_{14} & q_{15} & q_{16} & q_{17} & q_{18} \\ q_{21} & q_{22} & q_{23} & q_{24} & q_{25} & q_{26} & q_{27} & q_{28} \\ q_{31} & q_{32} & q_{33} & q_{34} & q_{35} & q_{36} & q_{37} & q_{38} \\ q_{41} & q_{42} & q_{43} & q_{44} & q_{45} & q_{46} & q_{47} & q_{48} \\ q_{51} & q_{52} & q_{53} & q_{54} & q_{55} & q_{56} & q_{57} & q_{58} \\ q_{61} & q_{62} & q_{63} & q_{64} & q_{65} & q_{66} & q_{67} & q_{68} \\ q_{71} & q_{72} & q_{73} & q_{74} & q_{75} & q_{76} & q_{77} & q_{78} \\ q_{81} & q_{82} & q_{83} & q_{84} & q_{85} & q_{86} & q_{87} & q_{88} \end{bmatrix} \longrightarrow Q' = \begin{bmatrix} q_{11} & q_{12} \\ q_{21} & q_{22} \end{bmatrix} \sim 603$$

$$F_{ij}' \bullet Q' = \begin{bmatrix} f_{11}q_{11} & f_{12}q_{12} \\ f_{21}q_{21} & f_{22}q_{22} \end{bmatrix} \sim 605$$

604

$$X = \frac{1}{8} C^T \left( F_{ij}' \bullet Q' \right) C = \frac{1}{8} \begin{bmatrix} 1 & 1 \\ 1 & -1 \end{bmatrix} \begin{bmatrix} f_{11}q_{11} & f_{12}q_{12} \\ f_{21}q_{21} & f_{22}q_{22} \end{bmatrix} \begin{bmatrix} 1 & 1 \\ 1 & -1 \end{bmatrix}$$

METHOD AND SYSTEM FOR DECODING ENCODED IMAGES AND REDUCING THE SIZE OF SAID IMAGES

FIELD OF THE INVENTION

The present invention relates generally to digital image processing. More particularly, the present invention relates to a method for decreasing the computing power required to decompress JPEG-encoded digital images for the purpose of displaying them on small screens such as those found on mobile handheld devices.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

BACKGROUND OF THE INVENTION

Digital imaging has, in recent years, become the leading standard by which photographs, designs and other visual elements are captured, created, stored and displayed. Images, like all computer-readable media, contain a significant amount of binary data which employs a significant amount of computing resources, particularly in terms of storage requirements. As a result, compression algorithms and decoders are used to make image information fit into a smaller data file.

Compression algorithms vary widely depending on the nature of the data in question and are well known in the art. In terms of digital imaging, one such algorithm is the JPEG, or Joint Photographic Experts Group compression, as defined in *Terminal Equipment and Protocols for Telematic Services: Information Technology—Digital Compression and Coding of Continuous-Tone Still Images—Requirements and Guidelines*, CCITT Rec. T.81 (1992 E), which is herein incorporated by reference in its entirety. According to this method, an image file, which is made up of a large matrix of spatial coefficients corresponding to pixel information, is first transformed from the pixel domain to a compressed domain using a mathematical transform. The transform typically employed, as will be appreciated by one skilled in the art, is the Discrete Cosine Transform or DCT. This transform is particularly effective for image compression since it stores the majority of the original signal data in low-frequency components in the transformed, DCT domain. The resultant coefficients in the frequency domain are then quantized, or reduced in size, by factors that depend on the coefficients' relative importance to the overall integrity of the image. This quantization process is a "lossy" compression as some of the image data will be lost as a trade-off for saving space and computing resources. The frequency components of the image that will be most noticeable to the human eye will naturally be quantized to a lower degree, as losses in the information in this frequency range will be more damaging to the overall integrity of the image.

Following quantization, the image file is a matrix of quantized DCT coefficients, also known as quantized DCT indices, and is substantially smaller than the uncompressed binary data that made up the raw image. As a final step, this matrix goes through a process known as entropy encoding to further reduce it in size. Many entropy encoding procedures are known in the art. One such example is Huffman encoding. For the purposes of the following discussion, a person skilled in the art will appreciate that any reference to Huffman decoding can equally refer to any other method of entropy decoding. Once the Huffman encoding process is complete, the resultant file is a JPEG encoded image which can be stored within any kind of computer-readable storage means. JPEG compression is well known in the art, and those of ordinary skill in the field will appreciate that varying techniques in carrying out the process may be used.

In order for the compressed image to be viewed or edited, the compressed image file must go through the reverse of the encoding process. In general, the stored JPEG image first goes through Huffman decoding followed by dequantization, or up-scaling each of the frequency components of the image by the same factor as they were downscaled during compression, and finally, the inverse of the DCT operation. In this manner, the stored JPEG image can then be displayed.

Like the compression process, the decompression requires significant computing power, as many calculations are necessary in order to apply each step of the algorithm. In cases where limited computing power is available, this process can be detrimental to overall system performance and can result in long lag times. This is especially true for mobile handheld devices such as cellphones, PDAs and the like which, by virtue of their size, have reduced computing resources.

There is an additional problem that renders JPEG decompression difficult for handheld devices. Since they almost invariably possess screens which are smaller in size (and/or with lower resolution) than the image which they seek to display, an un-downsampled or spatially un-downscaled image will typically not fit within the confines of the screen. As such, the image must be spatially downscaled, for example, by taking the average of adjacent pixel data or truncating a portion of the pixel coefficients from the image file. Regardless of which method is employed, however, additional calculations must be performed, in order to carry out the spatial downscaling. This can result in increased delay times in loading an image for viewing on a mobile, handheld device. In some cases, important image data is discarded as a sacrifice for faster image processing. This can result in distortion of the image.

It is, therefore, desirable to provide a method to quickly decompress and view JPEG-encoded images using fewer computing resources, while ensuring that the image displayed is as faithful as possible to the source image.

BRIEF DESCRIPTION OF THE DRAWINGS

Other aspects and features of the present invention will become apparent to those ordinarily skilled in the art upon review of the following description of specific embodiments of the invention in conjunction with the accompanying figures. Embodiments of the present invention will now be described, by way of example only, with reference to the attached Figures, wherein:

FIG. 2 shows the matrices involved in the decompression and downsampling process.

FIG. 4a shows the general truncation operation performed on a DCT index block in accordance with an embodiment of the present invention, while FIG. 4b shows an exemplary version of the same operation.

FIG. 5 shows the downsampling and dequantization process for one DCT index block of a JPEG-encoded image according to one embodiment of the invention, namely, for cases where a JPEG-encoded image is to be reduced by a factor of 1.6.

FIG. 6 shows the steps involved in decoding one DCT index block of a JPEG-encoded image according to an embodiment of the invention, whereby a JPEG encoded image is to be reduced by a factor of 4.

DETAILED DESCRIPTION

Figure 1:
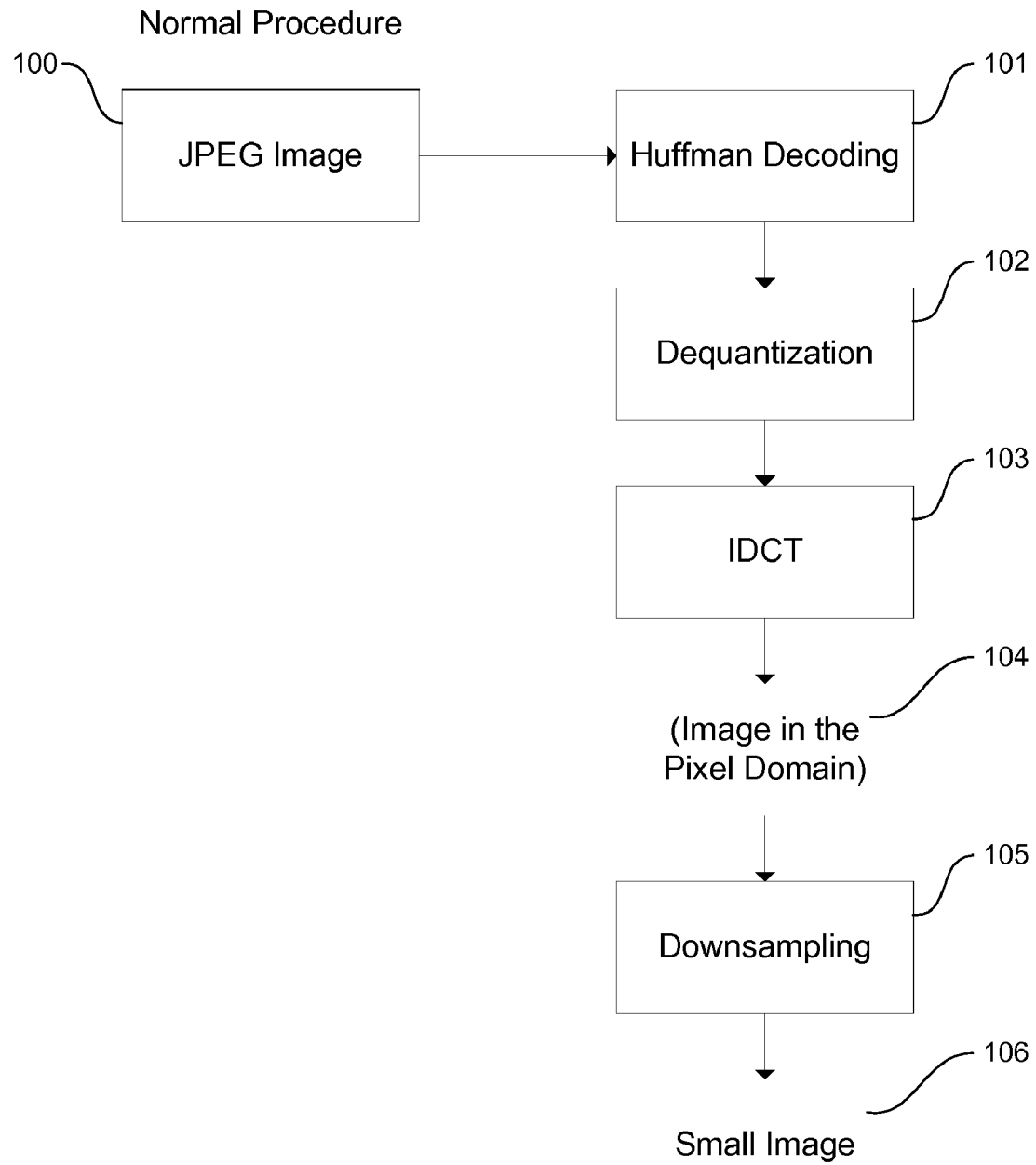
FIG. 1 is a block diagram of the standard JPEG decompression and downsampling process.

It is an object to obviate or mitigate at least one disadvantage of previous JPEG decoders, and e.g. to reduce the long load times required to display JPEG-encoded images on screens smaller than the resolution of the uncompressed image.

We have developed a method and system for reducing the number of mathematical operations required in the JPEG decoding process without substantially impacting the quality of the image displayed. Embodiments provide an efficient JPEG decoding process for the purposes of displaying an image on a display smaller than the source image, for example, the screen of a handheld device.

According to one aspect of the invention, this is accomplished by reducing the amount of processing required for dequantization and inverse DCT (IDCT) by effectively reducing the size of the image in the quantized, DCT domain prior to dequantization and IDCT. This can be done, for example, by discarding unnecessary DCT index rows and columns prior to dequantization and IDCT. In one embodiment, columns from the right, and rows from the bottom are discarded such that only the top left portion of the block of quantized, and DCT coefficients are processed. Another embodiment utilizes the fast AAN IDCT transform, named after the authors Y. Arai, T. Agui, and M. Nakajima, "A fast DCT-SQ scheme for images," *Trans. IEICE*, vol. E-71, no. 11, pp. 1095-1097, November. 1988, the contents of which are hereby incorporated by reference in their entirety. In this embodiment, rows and columns are discarded which are not needed for an AAN IDCT transform to produce a downscaled image using mean filtering.

Accordingly, one aspect of the invention provides a method of decoding an encoded image, the method comprising: performing an entropy decoding operation on a compressed image to generate an image file made up of index blocks in a quantized, transform domain; reducing the image size in the quantized, transform domain to generate an image file made up of reduced index blocks in the quantized, transform domain prior to dequantization and inverse transform operations; dequantizing the reduced index blocks by multiplying each block by a quantization step size block to generate an image file made up of quantized coefficient blocks in the dequantized, transform domain; and performing an inverse transform operation to generate an image file of reduced pixel value blocks in the pixel domain. Such a method is particularly well suited for producing an image file which is reduced in size from that of an original JPEG encoded image. This is advantageous for presentation on a display smaller in size than size of the original JPEG encoded image, and is particularly advantageous for reducing the processing required to do so as compared to prior art methods. Another aspect of the invention provides a device for decoding and displaying an encoded image, comprising: means for performing an entropy decoding operation on a compressed image to generate an image file made up of index blocks in a quantized, transform domain; means for reducing the image size in the quantized, transform domain to generate an image file made up of reduced index blocks in the quantized, transform domain prior to dequantization and inverse transform operations; means for dequantizing the reduced index blocks by multiplying each block by a quantization step size block to generate an image file made up of quantized coefficient blocks in the dequantized, transform domain; means performing an inverse transform operation to generate an image file of reduced pixel value blocks in the pixel domain; and display means for displaying said image file. Another aspect of the invention provides a computer program product stored in a machine readable medium comprising instructions, which when executed by a processor of a device, causes said device to decode a JPEG-encoded image, said instructions comprising instructions for: performing an entropy decoding operation on a compressed JPEG image to generate an image file made up of index blocks in a quantized, transform domain; reducing the image size in the quantized, transform domain to generate an image file made up of reduced index blocks in the quantized, transform domain prior to dequantization and inverse transform operations; dequantizing the reduced index blocks by multiplying each block by a quantization step size block to generate an image file made up of quantized coefficient blocks in the dequantized, transform domain; and performing an inverse transform operation to generate an image file of reduced pixel value blocks in the pixel domain.

FIG. 1 shows the block diagram of the standard JPEG decompression and downsampling process. The process begins with a compressed JPEG image 100 stored in, for example, a flash memory device. The first operation is Huffman decoding 101, whereby a JPEG-encoded image is reduced to a set of 8×8 blocks of quantized DCT indices.

Following Huffman decoding, the blocks must be dequantized. Dequantization 102 is essentially the inverse of the quantization operation. Each frequency component is multiplied by the scale factor by which it was divided during compression in order to regenerate the original dequantized frequency components.

The components must be transformed back to the pixel-domain in order to reconstruct the image, because one of the steps in the JPEG compression process is the application of a Discrete Cosine Transform (DCT) to map the original source image from the pixel domain to the DCT domain. An Inverse Discrete Cosine Transform (IDCT) 103 thus forms the next step in the decompression process. The IDCT operation is well-known in the art.

The IDCT operation results in the full, uncompressed JPEG image in the pixel-domain 104. In order to display the image on a screen of a specific size, particularly that of a mobile, handheld device, the image must be spatially downscaled 105 to fit the resolution of the screen. Once this is done, the smaller image 106 may be displayed.

FIG. 2 shows the matrices behind each of the steps described above. Following Huffman decoding, there is a full image block 201 which is made up of DCT index blocks 202. Each DCT index block 202 is an 8×8 matrix of quantized DCT indices 203. As each of these indices must be dequantized by a corresponding quantization step size, the dequantization operation 102 is best accomplished by multiplying each DCT index block 202 by a corresponding quantization step size matrix 204. For example, a DCT index block of size 8×8 will be multiplied by a quantization step size matrix also of size 8×8. This is a scalar multiplication, whereby each element in the DCT index block 202 is multiplied by its corresponding element in the quantization step size matrix

204. Since a DCT index block is 8×8, this dequantization operation requires a total of 64 multiplications per block.

The completion of the dequantization operation results in an image matrix made up of blocks of dequantized DCT indices 205. As these blocks contain coefficients in the DCT domain, they must be converted back to the pixel domain to reconstruct the original image. This is accomplished by applying an Inverse DCT (IDCT) to each element of the dequantized DCT index blocks. The IDCT operation is well known in the art, as it has applications across many forms of signal processing, including digital imaging. The DCT and IDCT operations are discussed at length by by N. Ahmed, T. Natarajan, and K. R. Rao, "Discrete Cosine Transform", *IEEE Trans. Computers*, 90-93, January 1974, which is incorporated herein by reference.

For an 8×8 block of DCT coefficients $f_{nm}$, the 2D IDCT algorithm is given by $$x_{ij} = \frac{1}{4}\sum_{n=0}^{7}\sum_{m=0}^{7}\cos\frac{\pi n(2i+1)}{16}\cos\frac{\pi(2j+1)}{16}a_n a_m f_{nm}$$

where $x_{ij}$ is the image coefficient in the spatial domain at the position of (i, j). The coefficient $a_n$ is given by $$a_0 = \frac{1}{\sqrt{2}} \text{ and } a_n = 1 \text{ for } 1 \leq n \leq 7.$$

This operation can be seen as a cascade of 1D transforms applied to the rows and columns of the 8×8 block of DCT coefficients. The 1D transform is given by $$x_k = \sum_{n=0}^{N-1}\cos\frac{\pi n(2k+1)}{16}a_n y_n$$

where $x_k$ is the original source signal and $y_n$ is its corresponding DCT coefficient. The coefficient $a_n$ is given by $$a_0 = \frac{1}{\sqrt{8}} \text{ and } a_n = \sqrt{\frac{2}{8}} \text{ for } 1 \leq n \leq 7.$$

Since the IDCT operation is carried out as a matrix multiplication, the two-dimensional IDCT operation can be represented as $$X = \frac{1}{8}C^T F C$$

where F is an 8×8 block of dequantized DCT coefficients, X is its corresponding block of image coefficients 206 in the pixel domain, C is a matrix defined as:

$$C = \begin{bmatrix} 1 & 1 & 1 & 1 & 1 & 1 & 1 & 1 \\ \sqrt{2}\cos\frac{1}{16}\pi & \sqrt{2}\cos\frac{3}{16}\pi & \sqrt{2}\cos\frac{5}{16}\pi & \sqrt{2}\cos\frac{7}{16}\pi & \sqrt{2}\cos\frac{9}{16}\pi & \sqrt{2}\cos\frac{11}{16}\pi & \sqrt{2}\cos\frac{13}{16}\pi & \sqrt{2}\cos\frac{15}{16}\pi \\ \sqrt{2}\cos\frac{2}{16}\pi & \sqrt{2}\cos\frac{6}{16}\pi & \sqrt{2}\cos\frac{10}{16}\pi & \sqrt{2}\cos\frac{14}{16}\pi & \sqrt{2}\cos\frac{18}{16}\pi & \sqrt{2}\cos\frac{22}{16}\pi & \sqrt{2}\cos\frac{26}{16}\pi & \sqrt{2}\cos\frac{30}{16}\pi \\ \sqrt{2}\cos\frac{3}{16}\pi & \sqrt{2}\cos\frac{9}{16}\pi & \sqrt{2}\cos\frac{15}{16}\pi & \sqrt{2}\cos\frac{21}{16}\pi & \sqrt{2}\cos\frac{27}{16}\pi & \sqrt{2}\cos\frac{33}{16}\pi & \sqrt{2}\cos\frac{39}{16}\pi & \sqrt{2}\cos\frac{45}{16}\pi \\ \sqrt{2}\cos\frac{4}{16}\pi & \sqrt{2}\cos\frac{12}{16}\pi & \sqrt{2}\cos\frac{20}{16}\pi & \sqrt{2}\cos\frac{28}{16}\pi & \sqrt{2}\cos\frac{36}{16}\pi & \sqrt{2}\cos\frac{44}{16}\pi & \sqrt{2}\cos\frac{52}{16}\pi & \sqrt{2}\cos\frac{60}{16}\pi \\ \sqrt{2}\cos\frac{5}{16}\pi & \sqrt{2}\cos\frac{15}{16}\pi & \sqrt{2}\cos\frac{25}{16}\pi & \sqrt{2}\cos\frac{35}{16}\pi & \sqrt{2}\cos\frac{45}{16}\pi & \sqrt{2}\cos\frac{55}{16}\pi & \sqrt{2}\cos\frac{65}{16}\pi & \sqrt{2}\cos\frac{75}{16}\pi \\ \sqrt{2}\cos\frac{6}{16}\pi & \sqrt{2}\cos\frac{18}{16}\pi & \sqrt{2}\cos\frac{30}{16}\pi & \sqrt{2}\cos\frac{42}{16}\pi & \sqrt{2}\cos\frac{54}{16}\pi & \sqrt{2}\cos\frac{66}{16}\pi & \sqrt{2}\cos\frac{78}{16}\pi & \sqrt{2}\cos\frac{90}{16}\pi \\ \sqrt{2}\cos\frac{7}{16}\pi & \sqrt{2}\cos\frac{21}{16}\pi & \sqrt{2}\cos\frac{35}{16}\pi & \sqrt{2}\cos\frac{49}{16}\pi & \sqrt{2}\cos\frac{63}{16}\pi & \sqrt{2}\cos\frac{77}{16}\pi & \sqrt{2}\cos\frac{91}{16}\pi & \sqrt{2}\cos\frac{105}{16}\pi \end{bmatrix}$$

and $C^T$ is its transpose. In order to arrive at a block of image coefficients 206, 4,096 multiplications must be carried out per dequantized DCT index block in addition to the 64 multiplications required for the dequantization operation. As a result, a computer must carry out 4,160 multiplications in order to convert each Huffman-decoded DCT index block 202 back to its original block of image coefficients 206 in the pixel domain. Since a full image comprises a very large number of DCT index blocks, the dequantization and IDCT operation often requires significant computing power. Once the IDCT operations are complete, the resulting matrix is the original, uncompressed image 207.

There is one final operation that must be carried out before the image can be displayed on a small screen. An image with a resolution of 1280×1024, for example, will only fit on a screen of 320×256 pixels if the image is downscaled by a factor of 4. This imparts an additional mathematical step to the overall display operation. The image must be spatially scaled, or downsampled by a factor determined by the original image size relative to the size of the screen on which it is to be displayed. Needless to say, the computational complexity in carrying out all of the foregoing operations is substantial.

One example of a method for reducing the complexity inherent in the decompression and downscaling operations involves performing the downsampling operation in the DCT domain by discarding higher-order DCT indices following the dequantization calculation. This has the advantage of reducing the complexity of the IDCT operation, as the size of the blocks which undergo the IDCT operation has been reduced. An example of such a method is discussed in U.S. Pat. No. 7,050,656 to Bhaskaran, et al., which is incorporated herein by reference. However, downsampling in the dequantized DCT domain still requires the dequantization operation for every quantized DCT index.

A decoder according to an embodiment of the present invention reduces computational complexity even further by reducing the number of calculations needed for each of the dequantization and IDCT operations. This is achieved by reducing the size of the Image block made of quantized DCT index blocks in the quantized DCT index domain, by discarding rows and columns of the quantized DCT index blocks. This reduces the number of multiplications required during dequantization and for the IDCT operation, as only a smaller block of DCT indices need undergo the dequantization and IDCT operations.

Figure 3:
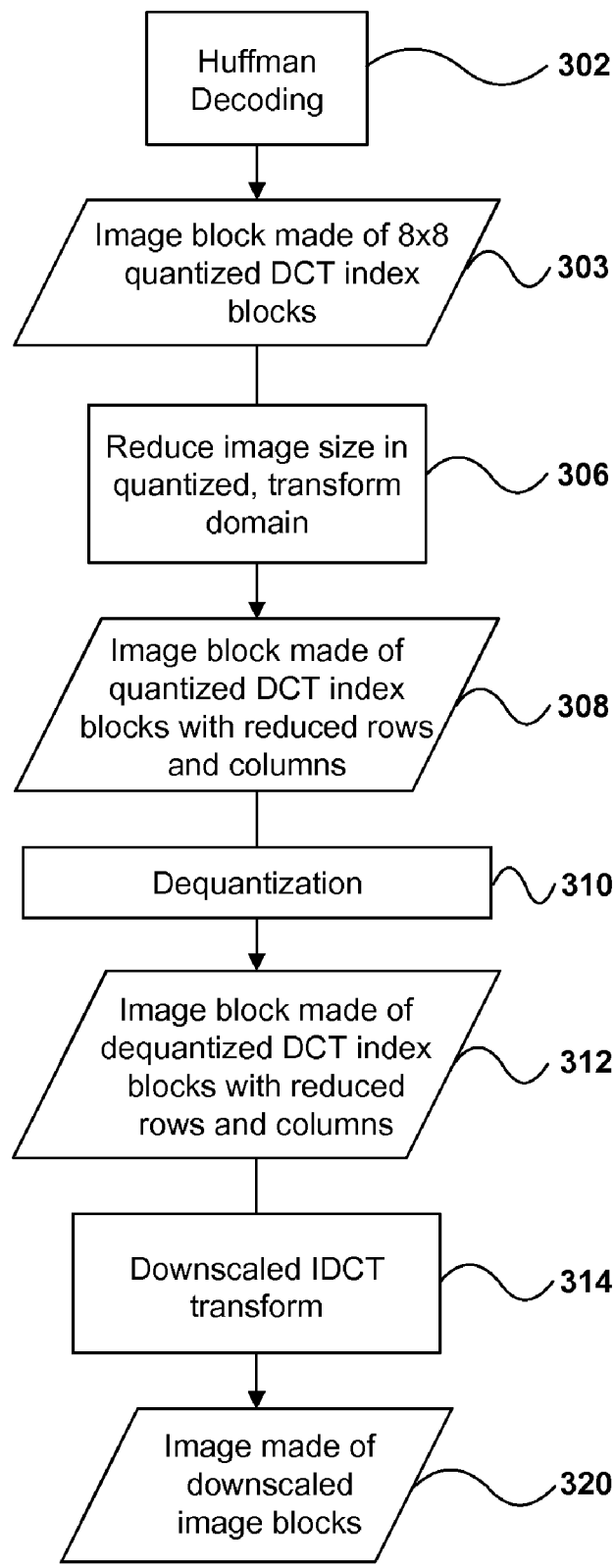
FIG. 3 is a block diagram of the decompression and downsampling method in accordance with an embodiment of the present invention.

FIG. 3 shows a block diagram of the fast JPEG decoder in accordance with an embodiment of the present invention. A JPEG image undergoes Huffman decoding 302, similar to the previous methods. This decoder, however, takes the full image block 303 which is made up of quantized DCT index blocks and reduces the size of the image block made of quantized DCT index blocks in the quantized DCT index domain 306 for example, by discarding the rows and columns of the quantized DCT index blocks. This results in an image block made of quantized DCT index blocks with reduced rows and columns 308. As should be appreciated, corresponding rows and columns in the quantization matrix are also discardable, prior to the dequantization step 310. This results in the image block made of dequantized DCT index blocks with reduced rows and columns 312. This downscaled image block then undergoes an IDCT transform 314 to produce the image made of downscaled image blocks 320. That should be appreciated the IDCT transform 314 can comprise separate row and column IDCT transforms.

Figures 4A, 4B:

We will now discuss a method of discarding rows and columns in step 306, according to an embodiment of the invention. Referring to FIG. 4a, Huffman decoding results in an image matrix 401 made up of quantized DCT index blocks 402. Rather than dequantizing every element of each index block 402, a decoder according to one embodiment of the present invention first reduces the index block size from the standard 8×8 to an N×N sized block 404, where 8/N is the factor, S, by which an image is to be downscaled in order to fit the desired screen size. N may be any integer, as long as it is less than 8, but not less than 1. This reduction is accomplished by truncating the higher-order quantized DCT indices from each DCT index block 402. By cutting off all indices of higher order from all of the index blocks, the whole image matrix 401, when reduced, contains substantially less data and therefore requires fewer calculations in the decompression operation. A person skilled in the art will appreciate that the higher order DCT indices correspond to the coefficients for higher frequency values. Since the nature of the DCT index blocks 402 is such that lower order, and therefore lower frequency, DCT indices are concentrated in the upper-left hand corner of each DCT index block 402, truncating indices except for the upper left-hand corner of the matrix will cut off the higher order indices while retaining the lower order ones. This can be accomplished without substantially damaging the integrity of the image, since variations in the strength of brightness at high frequencies are less discernable by the human eye than variations at lower frequencies.

FIG. 4b illustrates this operation by way of example. Returning to the example proposed earlier, suppose an image of 1280×1024 is to be displayed on a screen with a resolution of 320×256. The image is to be reduced by a factor of S=4; therefore, N would be equal to 2, and each 8×8 quantized DCT index block 402 would be reduced to a size 2×2 matrix 406. With the matrix of this size, the full dequantization step size matrix 407 (as stored in the JPEG header) is no longer required, and it can be truncated to include only the step sizes that correspond to the lower-order indices retained in the 2×2 matrix 406. The dequantization operation would now only require 4 multiplications rather than the 64 that would be required by the decompression methods taught by the prior art. Further, now that the image data has been reduced in accordance with the desired display size, the downsampling calculation 105 in the spatial domain is no longer necessary, as the downsampling effectively occurs in step 306 in this embodiment.

N need not be limited to 2. One of skill in the art will appreciate that N could be any number, subject to the constraint $1 \leq N \leq 7$.

Computing complexity is further reduced by the truncation operation since the device need only apply an IDCT operation to the newly-reduced DCT index blocks. In many cases, this operation can be further simplified. FIG. 5 illustrates this advantage of a decoder according to an embodiment of the present invention by way of example. Suppose, for the purposes of this example, N=5. First, all quantized DCT indices of order higher than 5 are discarded from the DCT index block $F_{ij}$ 501 resulting in reduced DCT index block $F_{ij}'$ 502. Then, the reduced block is dequantized through scalar multiplication of reduced DCT index block 502 by reduced quantization step table 503. Following dequantization 504, the reduced, dequantized DCT index block 505 undergoes an IDCT operation. Based on the matrix form of the IDCT discussed above, the value of C for a 5×5 IDCT is given by $$C = \begin{bmatrix} 1 & 1 & 1 & 1 & 1 \\ \sqrt{2}\cos\frac{1}{10}\pi & \sqrt{2}\cos\frac{3}{10}\pi & \sqrt{2}\cos\frac{5}{10}\pi & \sqrt{2}\cos\frac{7}{10}\pi & \sqrt{2}\cos\frac{9}{10}\pi \\ \sqrt{2}\cos\frac{2}{10}\pi & \sqrt{2}\cos\frac{6}{10}\pi & \sqrt{2}\cos\frac{10}{10}\pi & \sqrt{2}\cos\frac{14}{10}\pi & \sqrt{2}\cos\frac{18}{10}\pi \\ \sqrt{2}\cos\frac{3}{10}\pi & \sqrt{2}\cos\frac{9}{10}\pi & \sqrt{2}\cos\frac{15}{10}\pi & \sqrt{2}\cos\frac{21}{10}\pi & \sqrt{2}\cos\frac{27}{10}\pi \\ \sqrt{2}\cos\frac{4}{10}\pi & \sqrt{2}\cos\frac{12}{10}\pi & \sqrt{2}\cos\frac{20}{10}\pi & \sqrt{2}\cos\frac{28}{10}\pi & \sqrt{2}\cos\frac{36}{10}\pi \end{bmatrix}$$

By using the substitution $$\sqrt{2}\cos\frac{k\pi}{10} = c_k,$$

for k=1,2,3,4, this matrix can be represented as $$C = \begin{bmatrix} 1 & 1 & 1 & 1 & 1 \\ c_1 & c_3 & 0 & -c_3 & -c_1 \\ c_2 & -c_4 & -\sqrt{2} & -c_4 & c_2 \\ c_3 & -c_1 & 0 & c_1 & -c_3 \\ c_4 & -c_2 & \sqrt{2} & -c_2 & c_4 \end{bmatrix}$$

Through basic matrix factorization, this matrix can be simplified to $$C = \begin{bmatrix} 1 & 0 & 0 & 0 & 0 \\ 0 & 0 & 0 & 1 & 0 \\ 0 & 1 & 0 & 0 & 0 \\ 0 & 0 & 0 & 0 & 1 \\ 0 & 0 & 1 & 0 & 0 \end{bmatrix} \begin{bmatrix} 1 & 1 & 1 & 0 & 0 \\ c_2 & -c_4 & -\sqrt{2} & 0 & 0 \\ c_4 & -c_2 & \sqrt{2} & 0 & 0 \\ 0 & 0 & 0 & -c_3 & -c_1 \\ 0 & 0 & 0 & c_1 & -c_3 \end{bmatrix} \begin{bmatrix} 1 & 0 & 0 & 0 & 1 \\ 0 & 1 & 0 & 1 & 0 \\ 0 & 0 & 1 & 0 & 0 \\ 0 & -1 & 0 & 1 & 0 \\ -1 & 0 & 0 & 0 & 1 \end{bmatrix}$$

The IDCT transform can then be expressed as $$[y_0 \ y_1 \ y_2 \ y_3 \ y_4]C = \begin{bmatrix} y_0 + c_2 y_2 + c_4 y_4 \\ y_0 - c_4 y_2 - c_2 y_4 \\ y_0 - \sqrt{2} y_2 + \sqrt{2} y_4 \\ -c_3 y_1 + c_1 y_3 \\ -c_1 y_1 - c_3 y_3 \end{bmatrix}^T \begin{bmatrix} 1 & 0 & 0 & 0 & 1 \\ 0 & 1 & 0 & 1 & 0 \\ 0 & 0 & 1 & 0 & 0 \\ 0 & -1 & 0 & 1 & 0 \\ -1 & 0 & 0 & 0 & 1 \end{bmatrix}$$

Where $y_k$ is the DCT coefficient for $0 \leq k \leq 4$, and T means transposition. The above transform can be further simplified using the following equations:

$$y_0 + c_2 y_2 + c_4 y_4 = y_0 + (c_2 - c_4)(y_2 - y_4)/2 + (c_2 + c_4)(y_2 + y_4)/2$$

$$y_0 - c_4 y_2 - c_2 y_4 = y_0 + (c_2 - c_4)(y_2 - y_4)/2 - (c_2 + c_4)(y_2 + y_4)/2$$

$$y_0 - \sqrt{2} y_2 + \sqrt{2} y_4 = y_0 - 2(c_2 - c_4)(y_2 - y_4)$$

$$c_3 y_1 - c_1 y_3 = c_3(y_1 + y_3) - (c_1 + c_3)y_3$$

$$c_1 y_1 + c_3 y_3 = c_3(y_1 + y_3) + (c_1 - c_3)y_1$$

As can be seen by comparing the left and right sides of the above 5 equations, the un-simplified (left side of the) equations require 10 multiplications, while the simplified (right side of the) equations only need 5 multiplications. Therefore, only 5 multiplications are required for each column or row IDCT operation. As there are 5 rows and 5 columns, a total of 50 multiplications are required for the inverse transform. Dequantization requires 25 additional multiplications. As a result, in this example, a total of only 75 multiplication operations are required for the downsampling, dequantization and IDCT calculations for each 8×8 DCT index block for cases where N=5. As can be seen, this is a significant improvement over the multiplications needed in a conventional JPEG decompression, even when Fast IDCT algorithms (e.g., AAN) are used. For example, we believe the AAN algorithm proposed in Y. Arai, T. Agui, and M. Nakajima, "A fast DCT-SQ scheme for images," Trans. IEICE, vol. E-71, no. 11, pp. 1095-1097, November 1988. (the contents of which are hereby incorporated by reference), would require 144 multiplications for this example.

In a further example, consider the application for values where N=2. As shown in FIG. 6, a Huffman-decoded DCT index block 601 is truncated to a reduced, 2×2 sized block 602. The quantization step table is also truncated to size 2×2 603, and as a result, the dequantization operation 604 requires only 4 multiplications to arrive at the reduced, dequantized DCT index block 605. For this case, the matrix C for carrying out the IDCT calculation is given by $$C = \begin{bmatrix} 1 & 1 \\ 1 & -1 \end{bmatrix}$$

Thus, the IDCT operation 606 for cases where N=2 becomes greatly simplified, and many of the multiplication operations required for higher values of N are no longer necessary.

Furthermore, the blocks need not be confined to square matrices. By substituting the N×N matrix for one of size H×V, an image can be scaled to fit a rectangular screen of virtually any dimension, as long as H and V are both integers that are less than 8 but greater than or equal to 1.

Figure 7:
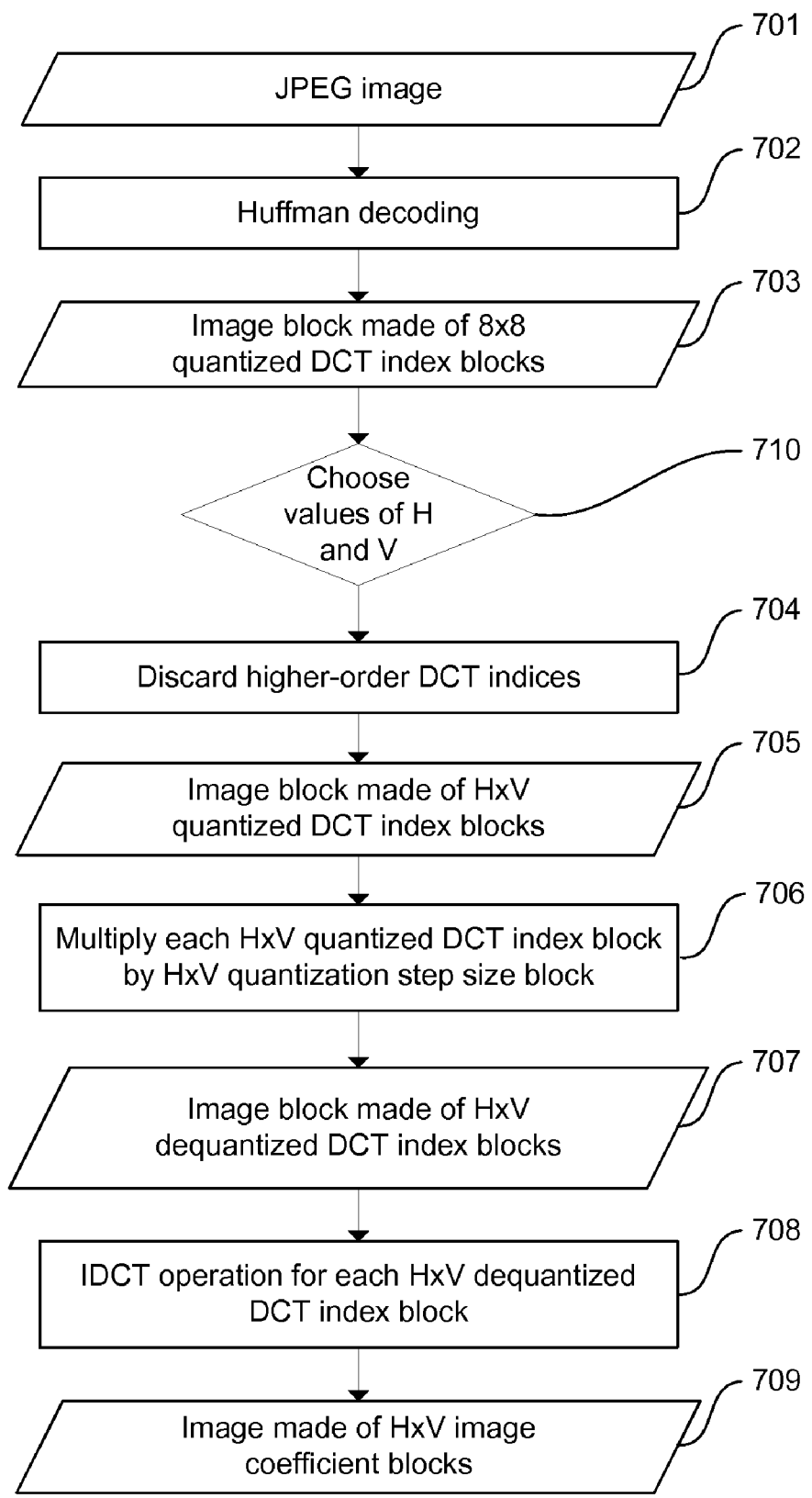
FIG. 7 shows the steps involved in JPEG decoding and resizing a JPEG image according to one embodiment of the present invention.

FIG. 7 shows the steps involved in decoding and resizing a JPEG image according to one embodiment of the present invention. A JPEG-encoded image file 701 first undergoes Huffman decoding 702, which results in an image file made up of 8×8 quantized DCT index blocks 703. Values of variables H and V are then chosen 710 based on the vertical and horizontal factors, S, respectively by which the image is to be downscaled. For example, if the image is to be reduced by a factor of 2 in both length and width, both H and V will be 4, according to the formula $$S = \frac{8}{N},$$

where N is either H or V. H and V need not be the same if the image is to be downscaled a different amount in the horizontal dimension from the vertical dimension. The DCT indices of orders higher than H and V are then discarded 704 from each 8×8 DCT index block, resulting in an image file made up of H×V quantized DCT index blocks 705. Each H×V quantized DCT index block is then dequantized 706 through multiplication by a quantization step size block of size H×V. This results in an image file made up of dequantized DCT index blocks 707. Finally, the H×V matrix form of the IDCT operation 708 is performed on each H×V dequantized DCT index block, which results in an image file made up of H×V image coefficient blocks 709 in the pixel domain.

Some embodiments of the invention can implement an optional feature which provides an additional advantage over the prior art. Since much of each quantized DCT index block is discarded, a full Huffman decoding of each block is no longer necessary. As one of reasonable skill in the art will appreciate, one of the stages of Huffman decoding is an amplitude determination, or, in terms of the JPEG standard cited above (CCITT Rec. T.81 (1992 E)), the "Extend procedure." This step is not necessary for any indices that are to be truncated prior to dequantization, since their individual amplitudes will have no bearing on the reconstructed image. As a result, the amplitude determination step of the Huffman decoding may be limited to the lower-order coefficients which will be retained during the downsampling operation. In other words, according to an embodiment, we skip the Extend (ZZ(K, Size)) step (e.g., as shown in Figure F.14 on page 107 of the above referenced (CCITT Rec. T.81 (1992 E)) for each position K which falls outside the truncated area (e.g., is not within the truncated matrix $F_{ij}'$).

We will now describe an alternative embodiment, which utilizes a different method for determining which rows and columns to discard in step 306.

Downscaling can also be realized with mean filtering. Table 1 illustrates an example of downscaling an image in the spatial domain by a factor of 4 in both horizontal and vertical axes. In this example the 8×8 block is divided into four 4×4 blocks. Each of the 4×4 blocks are then replaced with a single spatial co-efficient equal to the average of the pixels within the 4×4 block as illustrated in Table 1.

TABLE 1

Downscaling by mean filtering $$\begin{bmatrix} x_{00} & x_{01} & x_{02} & x_{03} & x_{04} & x_{05} & x_{06} & x_{07} \\ x_{10} & x_{11} & x_{12} & x_{13} & x_{14} & x_{15} & x_{16} & x_{17} \\ x_{20} & x_{21} & x_{22} & x_{23} & x_{24} & x_{25} & x_{26} & x_{27} \\ x_{30} & x_{31} & x_{32} & x_{33} & x_{34} & x_{35} & x_{36} & x_{37} \\ x_{40} & x_{41} & x_{42} & x_{43} & x_{44} & x_{45} & x_{46} & x_{47} \\ x_{50} & x_{51} & x_{52} & x_{53} & x_{54} & x_{55} & x_{56} & x_{57} \\ x_{60} & x_{61} & x_{62} & x_{63} & x_{64} & x_{65} & x_{66} & x_{67} \\ x_{70} & x_{71} & x_{72} & x_{73} & x_{74} & x_{75} & x_{76} & x_{77} \end{bmatrix} \longrightarrow \begin{bmatrix} y_{00} & y_{01} \\ y_{10} & y_{11} \end{bmatrix}$$

In FIG. 1, $x_{ij}$'s, $0 \leq i \leq 7$, $0 \leq j \leq 7$ are spatial domain coefficients, $y_{ij}$'s, $0 \leq i \leq 1$, $0 \leq j \leq 1$ are downscaled coefficients. The downscaling operation can be expressed as $$y_{00} = \frac{1}{16} \sum_{i=0}^{i=3} \sum_{j=0}^{j=3} x_{ij}, \quad y_{01} = \frac{1}{16} \sum_{i=0}^{i=3} \sum_{j=4}^{j=7} x_{ij},$$

$$y_{10} = \frac{1}{16} \sum_{i=4}^{i=7} \sum_{j=0}^{j=3} x_{ij}, \quad y_{11} = \frac{1}{16} \sum_{i=4}^{i=7} \sum_{j=4}^{j=7} x_{ij},$$

The above operation can be looked as a cascade of 1-dimensional mean filters for rows and columns. For each 1-dimensional case (i.e, for each row and column), the down sampling operation can be expressed by the following transform into the frequency domain:

$$y_0 = \frac{x_0 + x_1 + x_2 + x_3}{4} = \frac{1}{4} \sum_{n=0}^{3} \sum_{k=0}^{7} \cos \frac{\pi n(2k+1)}{16} a_n f_n \quad (1)$$

$$y_1 = \frac{x_4 + x_5 + x_6 + x_7}{4} = \frac{1}{4} \sum_{n=4}^{7} \sum_{k=0}^{7} \cos \frac{\pi n(2k+1)}{16} a_n f_n \quad (2)$$

Where $f_n$ is the DCT coefficient, $0 \leq n \leq 7$, $x_j$ is the spatial domain coefficient, $0 \leq j \leq 7$, and $y_k$ is the downsampled coefficient, $0 \leq k \leq 1$, $a_0 = 1/\sqrt{8}$, and $a_n = \sqrt{2}/\sqrt{8}$ for $1 \leq n \leq 7$.

Following the similar procedure as AAN algorithm for 8×8 DCT in [1], the above two equations can be simplified by merging a so-called weighting matrix into the quantization table to produce the following:

$$y_0 = f_0 + (f_1 - f_7) \times 2.6132593 + (f_5 - f_3) \times 1.0823922 \quad (3)$$

$$y_1 = f_0 - (f_1 - f_7) \times 2.6132593 - (f_5 - f_3) \times 1.0823922 \quad (4)$$

Assume the column IDCT transform is first applied. From the equations (3) and (4), we can see that for each row or column, only the coefficients $f_i$, i=0,1,3,5,7, are required for the computation. That is, we only need to dequantize DCT indices within rows 0, 1, 3, 5 and 7 and columns 0, 1, 3, 5 and 7. In other words, the DCT indices in rows and columns 2, 4 and 6 are not used. Thus these rows and columns can be discarded in step 306 as they do no affect the result. Therefore, only 25 multiplications are required for dequantization instead of 64 multiplications for a full inverse quantization with respect to an 8×8 DCT block. The two coefficients 2.6132593 and 1.0823933 in equations (3) and (4) can be merged into the quantization table.

Furthermore, as DCT indices within rows and columns 2, 4 and 6 of an 8×8 DCT block are not required for the computation, there is no need to actually produce them. Accordingly, an embodiment of the invention simplifies the entropy decoding operation by eliminating steps of the entropy decoding which would produce the non-zero DCT indices of the index blocks to be discarded. For example, an embodiment of the invention further reduces processing by decreasing the amount of processing utilized for Huffman decoding, in a manner similar to that described above. For example, according to an embodiment, the Extend procedure, which forms part of the Huffman decoding process, is not executed for rows and columns which will be discarded. Accordingly, such an embodiment reduces the processing requirements for Huffman decoding by eliminating the need for Huffman decoding operations for the "non-zero DCT indices" in those discarded rows and columns.

Another aspect of the invention provides a computer program product stored in a machine readable medium comprising instructions, which, when executed by a processor of a device, causes said device to carry out the methods described herein.

We will discuss the methods and systems with reference to a particular exemplary application for which the embodiments of the invention are well suited, namely a wireless network where image files are compressed for transmission to a mobile wireless communication device, hereafter referred to as a mobile device. Examples of applicable communication devices include pagers, cellular phones, cellular smartphones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIG. 8.

Figure 8:
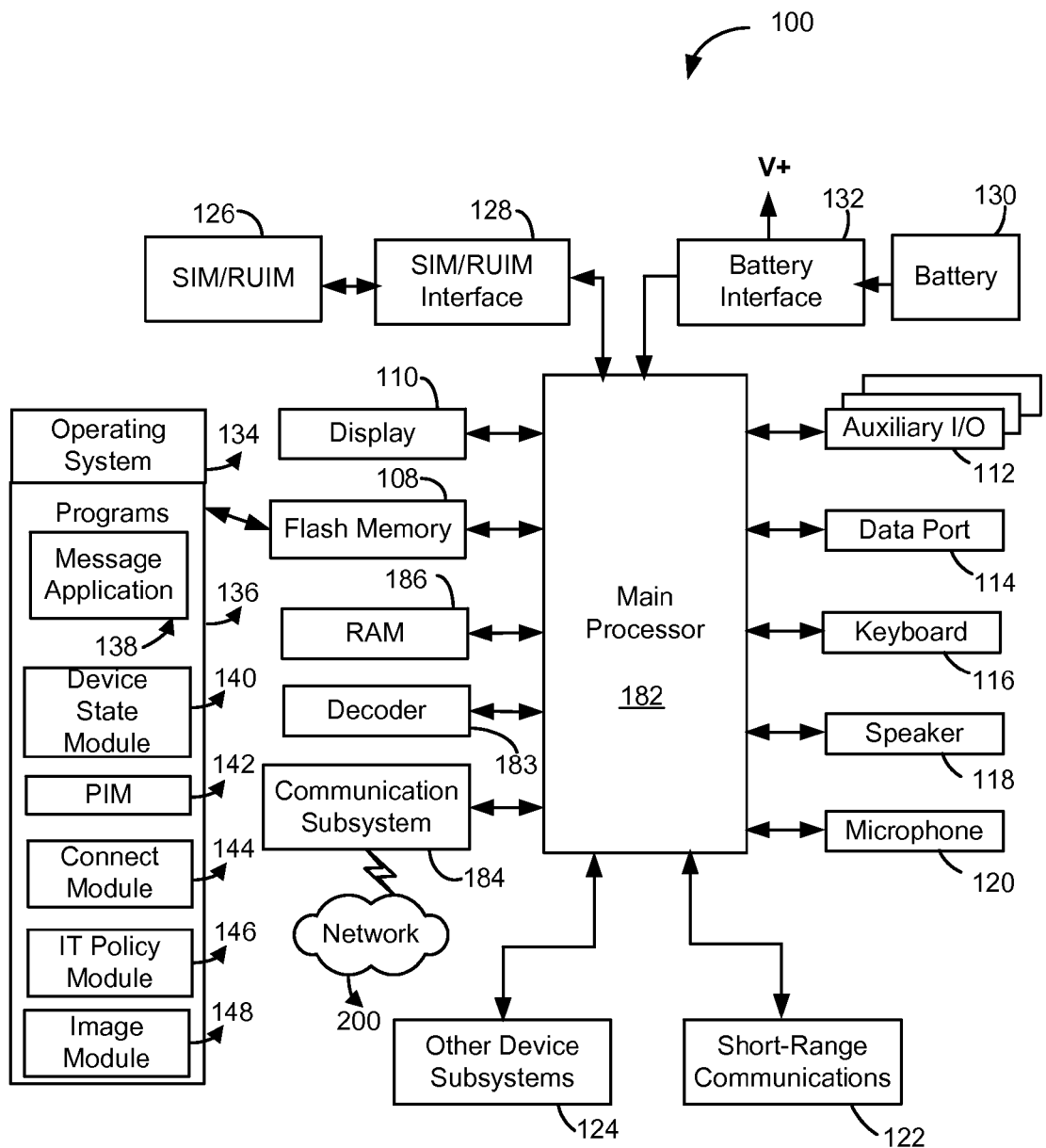
FIG. 8 is a block diagram of an exemplary embodiment of a mobile device which includes an image module capable of carrying out the methods described herein.

FIG. 8 is a block diagram of an exemplary embodiment of a mobile device 100. The mobile device 100 includes a number of components such as a main processor 182 that controls the overall operation of the mobile device 100. Communication functions, including data and voice communications, are performed through a communication subsystem 184. Data received by the mobile device 100 can be decompressed and decrypted by decoder 183, operating according to any suitable decompression techniques (e.g. YK decompression, and other known techniques) and encryption techniques (e.g. using an encryption techniques such as Data Encryption Standard (DES), Triple DES, or Advanced Encryption Standard (AES)). The communication subsystem 184 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one exemplary implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 186, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The display is used to display images which are either stored within the device memory, or received from the wireless network 200.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 148 which are described in more detail below. The operating system 134 and the software components 136 to 148 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 148, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device, 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an information technology (IT) policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

The image module 148 implements the methods described herein for displaying a reduced size image on the display 110.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A computer-implemented method of decoding an encoded image, the method comprising:
    performing, by a processor, an entropy decoding operation on a compressed image to generate an image file made up of index blocks in a quantized, transform domain;
    reducing, by the processor, the image size in the quantized, transform domain to generate an image file made up of reduced index blocks in the quantized, transform domain prior to dequantization and inverse transform operations;
    dequantizing, by the processor, the reduced index blocks by multiplying each block by a quantization step size block to generate an image file made up of quantized coefficient blocks in the dequantized, transform domain; and performing, by the processor, an inverse transform operation to generate an image file of reduced pixel value blocks in the pixel domain.

2. The method of claim 1 wherein the entropy decoding operation is Huffman decoding and wherein the transform is a Discrete Cosine Transform (DCT), and the transform domain is the DCT domain.

3. The method of claim 2 wherein reducing the image size in the quantized, DCT domain comprises discarding rows and columns of said index blocks to generate said reduced index blocks.

4. The method of claim 1 wherein reducing the image size in the quantized, DCT domain comprises discarding higher-order indices from the index blocks.

5. The method of claim 4 wherein discarding higher-order indices comprises discarding the rows and columns of said index blocks which include said higher-order indices.

6. The method of claim 5 wherein dequantizing the reduced index blocks comprises utilizing a quantization step size block of the same size as the reduced index blocks.

7. The method of claim 6 wherein dequantizing the reduced index blocks further comprises decreasing the size of the quantization step size block to the same size as the reduced index blocks.

8. The method of claim 3 wherein reducing the image size in the quantized, DCT domain is carried out according to vertical and horizontal scaling factors dependent on the size of a display that the image is to be displayed on.

9. The method of claim 8 wherein decreasing the size of the quantization step size block is carried out according to the same scaling factors used in reducing the image size.

10. The method claim 3 wherein reducing the image size in the quantized, DCT domain comprises discarding rows and columns which are not needed for an AAN IDCT transform to produce a downscaled image using mean filtering.

11. The method of claim 10 wherein each index block is originally of size 8×8 and is reduced to size 2×2 and wherein the step of discarding rows and columns which are not needed comprises discarding rows and columns 2, 4 and 6.

12. The method of claim 3 wherein said step of performing an entropy decoding operation is simplified by eliminating steps of the entropy decoding which would produce the non-zero DCT indices of said index blocks to be discarded.

13. The method of claim 12 wherein said step of eliminating steps of the entropy decoding comprises not executing the Extend procedure which forms part of said Huffman decoding for the non-zero DCT indices which will be discarded.

14. A computer program product, embodied on a tangible computer-readable medium, comprising instructions, which when executed by a processor of a device, cause said device to decode a JPEG-encoded image, said instructions comprising instructions for:

performing an entropy decoding operation on a compressed JPEG image to generate an image file made up of index blocks in a quantized, transform domain;

reducing the image size in the quantized, transform domain to generate an image file made up of reduced index blocks in the quantized, transform domain prior to dequantization and inverse transform operations;

dequantizing the reduced index blocks by multiplying each block by a quantization step size block to generate an image file made up of quantized coefficient blocks in the dequantized, transform domain; and performing an inverse transform operation to generate an image file of reduced pixel value blocks in the pixel domain.

15. The computer program product of claim 14 wherein the entropy decoding operation is Huffman decoding and wherein the transform is a Discrete Cosine Transform (DCT), and the transform domain is the DCT domain.

16. The computer program product of claim 15 wherein said instructions for reducing the image size in the quantized, DCT domain comprises is instructions for discarding rows and columns of said index blocks to generate said reduced index blocks.

17. The computer program product of claim 14 wherein said instructions for reducing the image size in the quantized, DCT domain comprises instructions for discarding higher-order indices from the index blocks.

18. The computer program product of claim 17 wherein discarding higher-order indices comprises discarding the rows and columns of said index blocks which include said higher-order indices.

19. The computer program product of claim 18 wherein dequantizing the reduced index blocks comprises utilizing a quantization step size block of the same size as the reduced index blocks.

20. The computer program product of claim 19 wherein dequantizing the reduced index blocks further comprises decreasing the size of the quantization step size block to the same size as the reduced index blocks.

21. The computer program product of claim 16 wherein reducing the image size in the quantized, DCT domain is carried out according to vertical and horizontal scaling factors dependent on the size of a display that the image is to be displayed on.

22. The computer program product of claim 21 wherein decreasing the size of the quantization step size block is carried out according to the same scaling factors used in reducing the image size.

23. The computer program product of claim 16 wherein reducing the image size in the quantized, DCT domain comprises discarding rows and columns which are not needed for an AAN IDCT transform to produce a downscaled image using mean filtering.

24. The computer program product of claim 23 wherein each index block is originally of size 8×8 and is reduced to size 2×2 and wherein the step of discarding rows and columns which are not needed comprises discarding rows and columns 2, 4 and 6.

25. A device for decoding and displaying an encoded image, comprising:

a processor configured to execute instructions embodied on a computer-readable medium to provide:

means for performing an entropy decoding operation on a compressed image to generate an image file made up of index blocks in a quantized, transform domain;

means for reducing the image size in the quantized, transform domain to generate an image file made up of reduced index blocks in the quantized, transform domain prior to dequantization and inverse transform operations;

means for dequantizing the reduced index blocks by multiplying each block by a quantization step size block to generate an image file made up of quantized coefficient blocks in the dequantized, transform domain;

means performing an inverse transform operation to generate an image file of reduced pixel value blocks in the pixel domain; and a display one for displaying said image file.

* * * * *